United States Patent [19]
Konwinski

[11] Patent Number: 5,097,017
[45] Date of Patent: Mar. 17, 1992

[54] PROCESS FOR MAKING SOY PROTEIN CONCENTRATE

[75] Inventor: Arthur H. Konwinski, Fort Wayne, Ind.

[73] Assignee: Central Soya Company, Inc., Fort Wayne, Ind.

[21] Appl. No.: 624,359

[22] Filed: Dec. 13, 1990

Related U.S. Application Data

[63] Continuation-in-part of Ser. No. 453,918, Dec. 20, 1989, abandoned.

[51] Int. Cl.$^5$ .............................. A23J 1/14; A23J 3/16; C07K 3/02; C07K 15/10
[52] U.S. Cl. ..................................... 530/378; 426/285; 426/454; 426/516; 426/656; 530/424; 530/427
[58] Field of Search ........................ 530/378, 424, 427; 426/285, 453, 454, 516, 517, 656

[56] References Cited

U.S. PATENT DOCUMENTS

| | | | |
|---|---|---|---|
| 3,023,107 | 2/1962 | Mustakas et al. | 530/424 |
| 3,707,380 | 12/1972 | Dunning et al. | 426/516 |
| 3,778,522 | 12/1973 | Strommer | 530/378 |
| 3,940,495 | 2/1976 | Flier | 426/104 |
| 3,950,564 | 4/1976 | Puski | 426/516 |
| 4,315,034 | 2/1982 | Levinson et al. | 426/656 |

OTHER PUBLICATIONS

"Oilseed Protein Concentrates and Isolates", E. W. Meyer, J. Am. Oil Chem. Soc., 48, 484–488 (1971).
Nitrogen Solubility Index or NSI (Method Ba-11-65), Official Method of the Am. Oil Chem. Soc.).
H. D. Fincher, "Processing of Oilseeds" in Processed Plant Protein Foodstuffs, A. M. Altschul, Editor, Academic Press, 1958.
A. Garcia Serrato, "Extraction of Oil from Soybeans", J. Am. Oil Chem. Soc., 58, 157 (1981).
E. D. Milligan, "Survey of Current Solvent Extraction Equipment", J. Am. Oil Chem. Soc., 53 286 (1976).
H. Rittner, "Conditioning of Oil–Bearing Materials for Solvent Extraction by Extrusion", J. Am. Oil Chem. Soc., 61 1200 (1984).
American Oil Chemists' Society Handbook of Official Methods, "Urease Activity", 1973.

Primary Examiner—Jeffrey E. Russel
Attorney, Agent, or Firm—Tilton, Fallon, Lungmus & Chestnut

[57] ABSTRACT

Process for making soy protein concentrate which includes agglomerating either dusty defatted soybean flakes or the dust itself in a screw device with substantially no die restriction at the discharge end, the material to be agglomerated having been subjected to moisture addition to bring the moisture content to 18-30%, maintaining the temperature in the range of 160°-300° and thereafter extracting the agglomerated material with 55-75% aqueous ethanol.

14 Claims, 2 Drawing Sheets

PROCESS FOR MAKING SOY PROTEIN CONCENTRATE

This application is a continuation-in-part of my copending application Ser. No. 453,918, filed Dec. 20, 1989, now abandoned.

Refined soy protein products are now widely used in the fabrication of a variety of food items and specialty feed products. These protein products provide good nutrition with requisite functional value at reasonable cost. The more prominent protein products include soy flours and grits, soy protein concentrates, soy protein isolates, and various textured products derived therefrom. Soy protein concentrates have proven especially useful because of their availability in several functional designs, increased protein content, excellent nutritional value and minimal soluble non-protein constituents, all at reasonable cost.

Soy protein concentrate has been described in commerce as a product prepared from high quality, sound, cleaned, dehulled soybeans by removing most of the oil and water-soluble non-protein constituents and containing not less than 70 percent protein ($N \times 6.25$) on a moisture-free basis (see A. K. Smith and S. J. Circle, Editors, "Soybeans: Chemistry and Technology, Volume I, Proteins," the AVI Publishing Co., 1972). More recent recommendations indicate that 65 percent protein ($N \times 6.25$) on a moisture-free basis would be a more useful criterion.

Soy protein concentrates are derived from defatted soybean flakes, grits, or flour. Although a variety of processes for the production of concentrates have been proposed in past years, at present, variants of two basic processes are commercially practiced. These two generic processes differ as to the means utilized to immobilize the major protein constituents of the defatted soybean source material during removal of the soluble non-protein substances from said material. One process involves the aqueous extraction or leaching of the defatted soybean material at a pH in the range 4.0-5.0, at which pH the major protein components are insoluble due to isoelectric association. After separation and washing, the wet insoluble fraction is processed in a variety of ways to produce a dry soy protein concentrate.

The other basic process consists of the utilization of aqueous ethanol of a specific concentration which immobilizes or insolubilizes the major protein fraction while solubilizing the lower molecular weight non-protein constituents. Usually, aqueous ethanol of about 60-70 percent (w/w) alcohol concentration is employed. Again, after extraction of solubles and washing, the residual wet soy protein concentrate is desolventized and dried to produce the finished product. For a further description of these basic processes see E. W. Meyer, "Oilseed Protein Concentrates and Isolates," J.Am. Oil Chem. Soc., 48, 484-488 (1971).

BACKGROUND OF THE INVENTION

The invention described herein as follows is concerned with a significant improvement in the aqueous ethanol extraction process for making soy protein concentrates. For the production of these concentrates, it is customary to employ clean soybeans of either a selected variety or field-run origin. These are dried, cracked, dehulled, moisture conditioned, and flaked prior to solvent extraction to remove the vegetable oil. The solvent is a selected fraction of lower alkane hydrocarbons known commercially as "hexane." After extraction the solvent-laden flakes are thoroughly desolventized and dried by heating with direct and then indirect steam. The preparation, extraction, desolventizing and drying of the soybean flakes are carried out in various continuous operating devices under a variety of moisture and temperature conditions. Although such devices and conditions are not a part of the present invention, they are important in establishing the physical and chemical nature of the defatted flakes which are used in the aqueous alcohol process for the production of soy protein concentrates. The thickness of such flakes is established by the spacing of the cracked bean flaking rolls prior to the solvent extraction unit operation. These rolls are set to produce full-fat flakes having a thickness of about 0.010 to 0.020 of an inch. For aqueous alcohol concentrate production, the desolventizing and drying operations are carried out under conditions which cause a minimum of protein denaturation in the defatted flakes. Excessive denaturation (e.g., toasting) results in a reduced rate of extraction of the soluble components by the aqueous alcohol.

The mechanical handling, conveying and transportation of defatted soybean flakes results in much breakage due to their fragility. The breakage produces fines or dust, very small particles in a range of sizes. The defatted flakes have a porous nature because of removal of oil. This enhances fragility. Fragility is related to flake thickness, and importantly, to the amount of moist steaming and heating they receive. This treatment results in protein denaturation with toughening of the flake. As noted above, this treatment is controlled so as not to adversely affect the aqueous alcohol extraction rate. The extent of such treatment is ordinarily determined by measuring the amount of water-soluble nitrogen or protein in the flake. One method is the Nitrogen Solubility Index or NSI (Method Ba-11-65, Official Method of the Am. Oil Chem. Soc.). Flakes ranging in NSI from about 50 to about 80 are usually used in the aqueous alcohol process. Flake fragility is related, in part, to NSI in that flakes with higher values are more fragile. Flakes with very low NSI, below 20, are most often avoided since excessive denaturation results in slower diffusion of the extractable flake constituents which include sugars, nitrogenous substances, mineral matter, etc. Obviously, the most significant factor in the production of flake fines and dust is the nature and extent of handling and transportation. Defatted flakes contain 10 to 30 percent material passing a No. 25 U.S.A. Standard Sieve (0.0278 in. nominal opening). In some instances, the content of such fine material may reach as high as 50 percent.

A variety of continuous countercurrent (flake to solvent flow) extraction devices of varying design are commercially available. Although these devices have been designed for the hexane extraction of vegetable oils from various seed products, several of these have been adapted for the production of soy protein concentrate.

Two basic principles are utilized in the design of the countercurrent hexane extractors. One is the immersion (or submergence) principle wherein the fat-bearing material (flake) is totally immersed in solvent and moves in a direction opposite to the solvent flow so that in-coming seed material is contacted with an oil-rich solvent or miscella, and the exiting material or flakes are contacted with fresh solvent, thereby insuring efficient removal of oil or fat. In devices operating according to the percolation principle, the fat-bearing material is automatically and continuously fed to moving containers or compartments with perforated bottoms. The drained solvent phase is pumped from one compartment to another countercurrent to the movement of fat-bearing seed material. Both horizontal and vertical devices are employed to remove the oil from full-fat soybean flakes by percolation of solvent phase through successive beds of said flakes with the oil-rich solvent phase percolating through the in-coming flakes and fresh solvent contacting the exiting defatted flakes. For a more thorough discussion of countercurrent extraction devices, see (a) H. D. Fincher, "Processing of Oilseeds" in Processed Plant Protein Foodstuffs, A. M. Altschul, Editor, Academic Press, 1958, (b) A. Garcia Serrato, "Extraction of Oil from Soybeans," J. Am. Oil Chem. Soc., 58, 157 (1981), and (c) E. D. Milligan, "Survey of Current Solvent Extraction Equipment," J. Am. Oil Chem. Soc., 53, 286 (1976).

In the utilization of these countercurrent devices for the aqueous alcohol extraction of defatted soybean flakes containing fines or dust, a number of serious processing problems arise which are proportional in magnitude to the amount of fines (e.g. minus No. 25 U.S.A. Standard Sieve) and particularly, the preponderance of very fine particles. In both immersion and percolation extraction systems, the fines and dust get into the solute-containing solvent stream. For example, in a vertical immersion column, the dust and small particulates tend to become entrained because of the greater density of the aqueous alcohol as compared to hexane (0.89–0.93 g/ml vs. 0.65–0.67 g/ml. for hexane; water about 1.0 g/ml). The floating dust leaves the extractor in the solute-rich solvent stream. In percolation extractors, the dust passes the perforations in the bottom of the compartments. Again, such dust is entrained in the exiting solvent stream. The fines and dust swell in the aqueous organic solvent and cause serious fouling and even plugging of pipes, circulation pumps, control valves, flow meters, and the like. This particulate matter settles in holding tanks causing additional problems. Obviously, the recovery of alcohol is a very vital factor in the economics of the production operation. Evaporators are customarily used for such recovery resulting in a soy sugar syrup byproduct. During such a process the fines and dust cake on the internal walls and components of the evaporators, impeding heat transfer and eventually necessitating a shutdown and cleaning. Since the unit is out of service during such cleaning, it impacts on product throughput and hence economy. It should be noted that fines and dust also cause foaming of the miscella during evaporation resulting in "spill-over" with contamination of the purified solvent. Antifoams must be used to prevent this insofar as possible.

Swollen fines cause another serious problem in percolation extractors. Such fines plug the drainage perforations impeding the flow of extraction solvent through the flake bed. In order to alleviate this problem, the bed depth is lowered to less than optimum, thereby restricting the throughput of the extractor. When vertical tray-containing or plate extractors are shut down for servicing of auxiliary equipment, the fines settle in the bottom trays impeding smooth startup.

Fines and dust in the solvent-wet concentrate cause further problems in the desolventizing-drying equipment. Poor drainage results in increased solvent entrainment and high desolventizing loads. The fines cake on heated surfaces resulting in less efficient heat transfer. The dust also plugs wet cyclones, condensers, and vapor pipes. It may even enter the air exhaust system, clogging filters.

It is quite apparent that fines and dust in the flake feed stream for the production of soy protein concentrate by aqueous alcohol extraction cause problems which are manifold and quite serious. It has been proposed that the problem be resolved by screening the flake stream just prior to extraction. This is an unsatisfactory resolution of the problem since it generates a significant by-product stream which must be disposed of at a reasonable price to maintain an economic processing operation. Further, such a stream will vary in volume with changing flake lots, making the problem of uniform disposal all the more difficult.

BRIEF SUMMARY OF THE INVENTION

I have discovered a novel agglomeration process whereby dusty defatted soybean flakes containing a high concentration of fines or the fines alone can be transformed into coherent particulates which are readily extractable by aqueous alcohol to produce soy protein concentrate meeting the specifications as established or considered by the trade. These particulates are sufficiently large so as to minimize or eliminate entirely the multitude of problems caused by dusty flake fines as recited in some detail above.

The agglomeration is carried out in a screw or auger device commonly known as an "extruder." Such are available in a variety of designs. My discovery is concerned with the novel and unusual conditions for operating the extruder for achieving a desirable agglomeration of dusty defatted soybean flakes or fines. The novel process described herein is positioned between the art of compacting full-fat soybean flakes or bean particles prior to hexane extraction and the extensive art of extruding defatted soy protein products to produce extrudates having a multi-lamellar structure designed to simulate fibrous meat tissue. The art of compacting full-fat soybean flakes prior to defatting by hexane extraction is described by H. Rittner, "Conditioning of Oil-bearing Materials for Solvent Extraction by Extrusion," J. Am. Oil Chem. Soc., 61 1200 (1984). A basic patent in the art of texturizing soy protein material to produce a fibrous meat-like product is that of R. J. Flier, U.S. Pat. No. 3,940,495 (2-24-76) titled, "Protein Product and Method for Forming Same." The new agglomeration process can be applied either to the dusty flakes or to the fines and dust alone which have been separated by screening. In some instances, the latter is desirable since it avoids the extrusion processing of the total flake stream and hence, saves energy.

I have discovered that agglomerates having suitable porosity for effective aqueous ethanol extraction can be produced by operating the extrusion device with no die or major restriction at the terminus of the screw or auger barrel such as is the case in compacting full-fat flakes by an expander or in making texturized soy protein products to simulate meat particles. Thus, my novel process is in distinct contrast to prior art. In the arts of compaction of full-fat soybean flakes and in the texturization of defatted soybean protein products, a variety of dies including face plate or peripheral dies are used in the expander or extruder process operations. Although the screw device and containing barrel of this invention may be tapered toward the distal end, I have found that the use of a die, as the art teaches, will negate the desirable structure that is required for efficient and effective extraction by aqueous alcohol. As a consequence of the lack of a restrictive die on the extrusion device at the discharge end, little back pressure is generated. Further, as a result of low back pressure, the shear working and shear heating of the dusty flakes or fines is minimal. This is in marked contrast to the expander compaction of full-fat flakes and the extruder texturization of defatted soy flours or grits. There is evidence that shear working of the proteinaceous feed material results in plastic flow of the protein to produce the meat-like textures in extruded products. Additional details on extruders can be seen in Puski and Konwinski, U.S. Pat. No. 3,950,564 (4-13-76) titled "Process of Making A Soy-Based Meat Substitute".

In the instant invention, the dusty defatted flakes or fines, prior to entering the screw or auger device, are moistened to a level of about 18-30 percent, primarily by the addition of water; however, some steam may be used. The barrel of the extrusion device may be heated to a temperature as high as 300° F. if the shear working within the extruder is minimal; or the barrel of the extruder may even be cooled if the shear working within the extruder is increased by using flow interruptions such as breaker bolts or screw sections containing interrupted flights, which promote mixing and provide some shear working of the material, hence raising the temperatures. The heating and cooling is so adjusted that the temperature of the discharging material is from about 160° F. to about 250° F. The exiting agglomerate contains almost the same moisture level as the starting moisturized product.

The moist agglomerate is extracted with aqueous ethanol without deliberate drying. Again, this is in contrast to both the process of full-fat soybean flake compaction in an expander and the extrusion texturizing of defatted soy protein materials. These are moisturized and heated by direct and indirect steam with further heat generated by the shear work of the screw or auger against a die restriction. This results in a flashing off of moisture upon emergence of the product from the die. In addition, the remaining moisture is further reduced by drying prior to either extraction of the compacted full-fat flakes or the further processing of the texturized defatted soy protein product.

The described novel process alleviates the very serious problems associated with the dusty defatted flakes in producing soy protein concentrates by countercurrent aqueous ethanol extraction in either immersion or percolation devices.

BRIEF DESCRIPTION OF DRAWING

The file of this patent contains at least one drawing executed in color. Copies of this patent with color drawings will be provided by the Patent and Trademark Office upon request and payment of the necessary fee.

The invention is described in conjunction with the accompanying drawing which includes four photomicrographs of fixed, embedded, and stained sections of representative products. Protein material is stained red with Safronin O and carbohydrate blue-green with Fast Green, the views being as follows.

DETAILED DESCRIPTION OF THE INVENTION

Figure 1:
FIG. 1 is a photomicrograph of dusty defatted soybean flakes and fines of the prior art under a magnification of 100X.

This invention is concerned with an improved process for making soy protein concentrate by the aqueous alcohol extraction of dusty defatted soybean flakes containing a significant content of fines in either immersion or percolation extraction systems of countercurrent design. Basically, the novel process of this invention alleviates the multitude of very serious problems caused by defatted flake fines and dust in the integrated concentrate production system. These have been recited in some detail above. The defatted flakes used in making concentrate are often referred to as "white flakes" since they are not subjected to high heat or toasting. These flakes will vary in Nitrogen Solubility Index from around about 50 to as high as about 80. As indicated, due to handling, conveying, transporting, and the like, these fragile flakes contain a very significant content of dust and very fine particulates.

As stated above, the dusty defatted flakes may contain as high as 50 percent fines of minus No. 25 U.S.A. Standard Sieve size. More often the content is in the range of 10-30 percent. For example, a dusty flakes sample containing 30 percent fines passing the No. 25 sieve may have a wide range of fine particles of varying size, as noted below:

| SIEVE SIZE OF FINES PASSING NO. 25 U.S.A. STANDARD SIEVE | | |
|---|---|---|
| U.S.A. STANDARD SIEVE | PERCENT | NOMINAL SIEVE OPENING, INCHES |
| Retained on No. 60 | 46 | .0098 |
| Retained on No. 80 | 9 | 0.0070 |
| Retained on No. 100 | 3 | 0.0059 |
| Retained on No. 200 | 12 | 0.0029 |
| Passing No. 200 | 30 | <0.0029 |
| TOTAL | 100 | |

It is thus apparent that the defatted flakes utilized in producing soy protein concentrate by countercurrent aqueous alcohol extraction processing may contain a very significant amount of very fine particles, more aptly described as dust. The total fraction of fine particulate matter is responsible for the multitude of processing problems described earlier.

I have discovered that dusty flakes and/or fines can be agglomerated into larger particles by a unique extruder process. The device used in this invention has, (a) some means for delivery of a constant flow of dusty defatted flakes or fines to an auger or screw enclosed in a close fitting barrel housing, (b) means for adding water and/or steam to the flakes at or prior to the entrance to the auger section, and (c) some means for adding steam directly and/or indirectly to the auger section for the purpose of heating material in transit. The auger may be tapered, have variable pitch, be single or multi-sectional, and have interrupted flights. The auger housing or barrel may have a smooth, rifled, or ribbed bore. Further, it may be jacketed to permit the use of an indirect heating or cooling medium. The extrusion device has a discharge end which is substantially free of restriction. Conventional extruders for producing fibrous textured products and expanders for compacting full-fat soybean flakes or particles have die openings which result in 50 percent or more restriction of the terminus of the screw device.

In determining the scope of this invention, a number of commercially available expanders and extruders were used after appropriate modification. In each instance, the terminal die structure was removed in order to leave an open throat to the barrel of the screw or auger device. A number of successful agglomeration trials were achieved using modified Wenger extrusion devices. These include the X-20 (25 HP) pilot plant size extruder, and the X-200 (200–250 HP) full-size commercial model, both manufactured by Wenger Manufacturing Co., Sabetha, Kans. Other useful trials were made on modified versions of the Anderson Expander-Extruder-Cooker (4¼ inch diameter, 50 HP) made by Anderson International Corp., Cleveland, Ohio, and the Tecnal EXP-250 (10 inch diam., 125 HP) sold by N. Hunt Moore Associates, Memphis, Tenn. Both single and twin screw devices are useful in practicing this invention if such devices are modified to remove restrictive die structures. Because of the varying design of the screw or auger machines as to water and steam injection and in barrel heating and cooling, some experimentation is necessary to find the best conditions for optimum agglomeration. The guidelines of this invention as described herein should make this a straightforward matter.

In one mode of practicing the described invention, the dusty defatted soy flakes and fines are screened just prior to extraction with aqueous ethanol. A commercial size screening device with a screen size of around about a No. 25 U.S.A. Standard sieve is useful for this purpose. Usually, screens ranging from No. 20 to No. 30 retain large enough flake particles to avoid the dust and fines processing problems. However, such practice is not confined to that size screen; others may be more suited to a given processing system. The screening or "throughs" which consist of flake dust and fines ar agglomerated according to the present invention before extraction. This preferred practice improves the economics of the total process since screening is not as energy demanding as agglomeration.

Expander-extrusion devices such as described above may have a moisturizing or conditioning chamber wherein the feed material is treated with water and/or steam, mixed, and conveyed to the screw or auger section of the machine. The water and/or steam is metered in to provide a feed mix containing 18 to 30 percent total moisture which includes the moisture content of the feed material. In practicing this invention, I prefer to use a feed mix containing 20 to 25 percent total moisture. The purpose of the moisture is to promote adhesion by solubilizing some of the protein present in the dusty flakes or dust and fines, as the case may be, and "setting" said protein in the heated screw or auger thus achieving the desired agglomeration.

The devices useful in practicing this invention have means for heating the material being processed during transit through the screw or auger. Such may be accomplished by steam injection in the mixing or conditioning chamber together with steam injection directly into the screw section and/or, more usually, indirectly via a jacketed barrel housing. I have found that agglomeration can be accomplished over a range of temperatures. The specific temperature for sufficient agglomeration is dictated by the internal configuration of the screw device and by the capability, or lack thereof, of external heating of the screw device. If the extruder or expander does not have provision for external heating, then the presence of breaker bolts and/or interrupted flights, combined with direct steam injection will provide sufficient mixing and shear working of the material so that agglomeration will be accomplished, and the temperature within the extruder will be in the range of 190° F. to 240° F. In contrast, screw devices having provision for external heating and less internal mixing and shearing of the material will require substantial external heat, in the range of 230° F. to 300° F., and extruders having increased mixing and shearing capabilities will require less external heating, even cooling in some cases, to obtain proper agglomeration of the material. I have found that combinations of external heating, steam injection, use of breaker bolts, interrupted flights, and other screw device configurations which can vary the degree of mixing and shear working of the material which result in material discharging from the extruder at temperatures from about 160° F. to about 250° F. will result in proper agglomeration. Temperatures sufficiently greater than about 250° F. are not desired because the process then becomes less energy efficient. Temperatures less than about 160° will result in insufficient agglomeration of the material discharging from the device. The difference in the amount of moist heat required to agglomerate the dusty defatted flakes or fines and that required for texturization to produce a fibrous product having meat-like qualities is indicated by the urease activity of the product. Urease is a moist-heat sensitive enzyme present in the soybean. A simple pH-change assay has been used for many years to incidate the amount of moist heating that defatted soybean materials have received. This method (Ba-9-58) is fully described in the American Oil Chemists' Society Handbook of Official Methods. Defatted soybean flakes which have been subjected to minimal moist heating in the desolventizing process and are properly stored will show a pH difference of about 3.0 units as compared to a blank. This is in sharp contrast to a typical texturized defatted soybean meal or flour which gives an assay value of 0.01 pH units or no urease activity. This is also to be contrasted to an agglomerated product of this invention which shows a value of about 1.63 pH units when the starting dusty defatted flakes had a starting value of 2.40 pH units.

I have found that under certain conditions, certain extrusion devices modified as described above produce agglomerate chunks which are sufficiently large so as to limit the rate of extraction of flake constituents soluble in the aqueous alcohol. In such instances I have found it practical to cut the moist agglomerate chunks in cutting machines such as a suitably sized Comitrol (Urschel Laboratories, Inc., Valparaiso, Ind.) or a Fitzmill (Fitzpatrick Co., Elhmurst, Ill.).

I have found that for good extraction rate, the agglomerated chunk should be cut to pass through a No. 4 U.S.A. Standard sieve (nominal sieve opening - 0.187 inches). Such cutting can be done with the minimal production of fines, easily less than 10 percent and most often less than five percent. For example, one ton or 2,000 pounds of defatted flakes containing 30 percent or 600 pounds of fines and dust will, after agglomeration and cutting, produce less than five percent or 30 pounds of fines material. This quantity in 2,000 pounds is not sufficient to cause processing problems. It should be pointed out that often cutting of the chunks is unnecessary when agglomeration conditions are optimum for a particular modified screw device.

The modification of the expander-extruder device to remove restrictive die assemblies results in a throughput rate that is at least double that when restrictive dies are used to prepare texturized soy protein wherein plastic protein flow produces laminar or fibrous structure. Thus it is significantly much less energy intensive.

The moist, hot agglomerated particles and chunks emerging from the screw device are somewhat sticky to the touch when sufficiently cool. The stickiness appears to be related to the starting NSI of the feed material. The higher the NSI, the greater the stickiness. This is understandable since NSI measures protein solubility, and soluble protein promotes adhesion as recited above. The agglomerated particles range in size from about one-tenth to one-fourth inches or somewhat larger. Usually, the agglomerates in any one trial or run will vary in size, and understandably, size is dependent upon the internal configuration of the particular modified screw device used and the moisture and temperature conditions prevailing. The particles are very irregular in shape, and somewhat darker in color than the starting material with a yellowish hue. The hot particles have a cooked beany odor. When sufficiently cool, the particles are compressible between the thumb and forefinger.

The dusty defatted soy flakes used in practicing this invention usually have an NSI (protein solubility) of 50 to 80. Flakes of somewhat lower NSI may be employed; however, I prefer that starting flakes with an NSI lower than about 20 to 25 not be used since the extractability of aqueous ethanol-soluble constituents is affected. During the agglomeration process the NSI will drop from about 50-80 to about 25-45. This decrease is again dependent upon the screw device used and the processing conditions of moisture and temperature.

The moist agglomerate particles, either from the modified screw device or from the cutting-sizing operation, are conveyed to an aqueous alcohol extraction device of either immersion or percolation design with countercurrent flow of solids and solvent. The extraction is carried out with aqueous ethanol of about 55 to about 75%, for example a 60–70 percent (w/w) alcohol concentration and at a temperature of about 125°–165° F. Further details are well described in the published art.

Dramatic evidence which supports the novel concept described herein is provided by a histological examination by light microscopy of the agglomerated particulates of the present invention and the products of prior art expander and textured treatments.

Figure 2:
FIG. 2 is a photomicrograph of expander processed (compacted) full-fat soybean flakes after hexane extraction of the prior art under a magnification of 100X.
Figure 3:
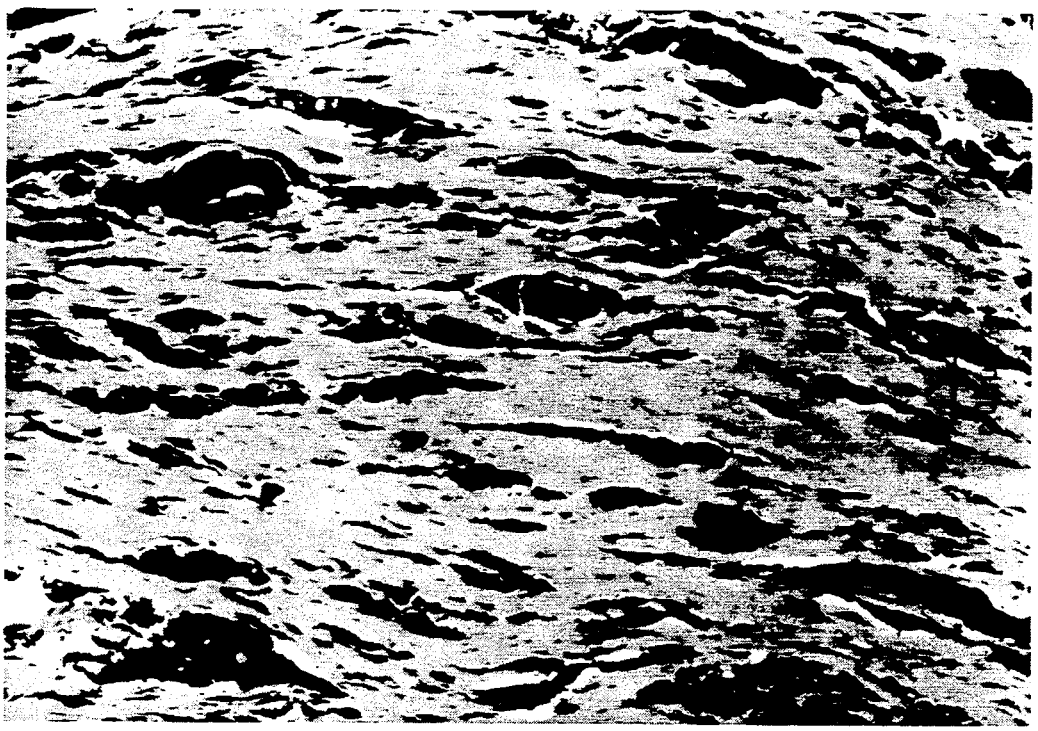
FIG. 3 is a photomicrograph of extrusion textured defatted soybean flakes of the prior under a magnification of 100X.

The photomicrograph of FIG. 1 clearly shows the organized cellular structure of dusty defatted soybean flakes which have received modest moist heat treatment in the removal of defatting solvent. FIG. 2 shows the basic structures of expander compacted full-fat soybean flakes. These have been defatted with hexane to provide comparable defatted materials for histological comparison. It is to be noted that compaction results in limited cell disruption with some protein fusion. Many cells remain intact encapsulating the protein of the soybean. The basic structure is relatively open. This permits ready extraction of fat by the alkane solvent. FIG. 3 sharply demonstrates the character of textured defatted soybean flakes which are processed by extrusion to simulate fibrous meat tissue. The high energy shear working, moist heat and forcing through a die structure result in extensive plastic flow of the protein affording longitudinally aligned elongated fibrous strands. In the prior art, this structure has been referred to as plexilamellar.

Figure 4:
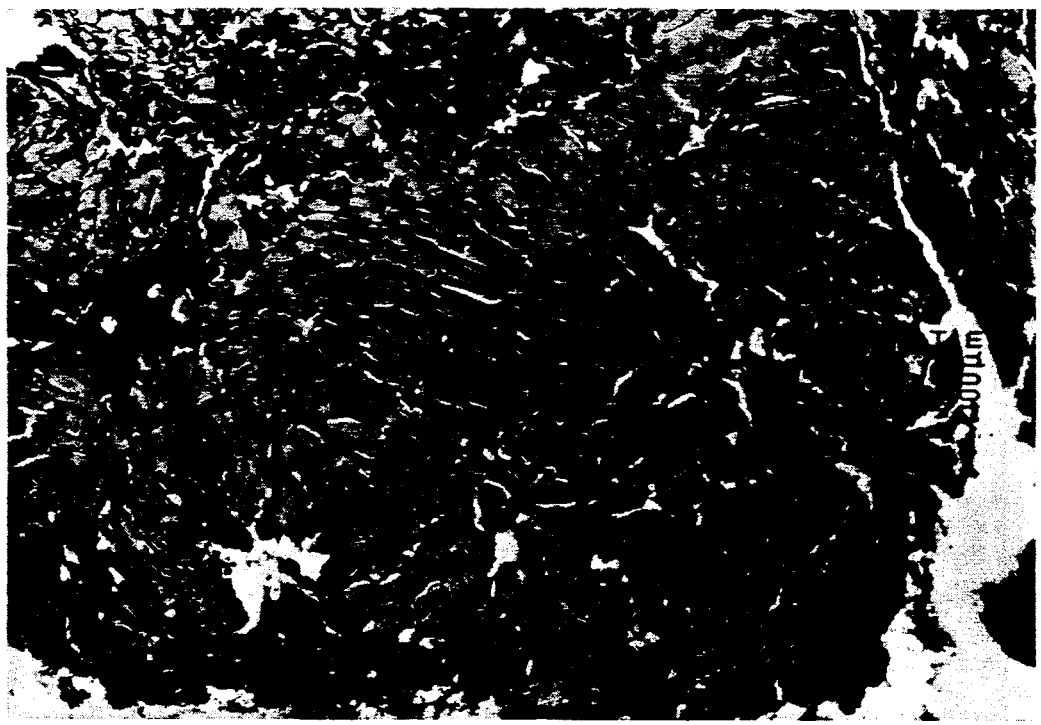
FIG. 4 is a photomicrograph of agglomerated defatted soybean flakes of the present invention under a magnification of 100X.

These prior art product structures are to be contrasted with the structure of the agglomerated product of the present invention as shown in FIG. 4. Here, there has been much cell disruption with aggregation of the protein into larger masses with minimal evidence of significant plastic flow. Further, the photomicrograph also shows a more dense structure which one would expect of the agglomeration process with limited shear and no forcing through an orienting die assembly.

The nature of the present invention is further illustrated by the following examples:

Example I

Dusty defatted soybean flakes obtained from a commercial source had the following composition: moisture, 6.74 percent; protein (N×6.25), 52.33 percent; crude fiber, 3.93 percent; crude fat, 0.58 percent; ash, 6.08 percent; and an NSI of 74.86. A sieve analysis indicated that these flakes contained 33.3 percent flake fines which passed a No. 30 U.S.A. Standard Sieve.

These dusty flakes were screened using a Sweco Separator, Model LS30 (manufactured by Sweco, Inc., Florence, Ky.) fitted with a 24 mesh screen to separate the fines. The particle size of those fines as determined by an Alpine air-jet sieve was as follows:

| | |
|---|---|
| 0 | percent retained on a No. 25 U.S.A. Standard sieve |
| 46.2 | percent retained on a No. 60 U.S.A. Standard sieve |
| 9.0 | percent retained on a No. 80 U.S.A. Standard sieve |
| 2.5 | percent retained on a No. 100 U.S.A. Standard sieve |
| 11.8 | percent retained on a No. 200 U.S.A. Standard sieve |
| 30.5 | percent passing a No. 200 U.S.A. Standard sieve |
| 100.0 | Total |

Further, these fines contained 6.71 percent moisture, 53.47 percent protein, 0.56 percent crude fat, 2.54 percent crude fiber, and 6.28 percent ash. The fines had an NSI of 78.6.

The fines were processed using a pilot-plant size Wenger Model X-20 extruder, (Wenger Manufacturing Co., Sabetha, Kans.) equipped with a 25 HP motor. The extruder shaft was comprised of eight screw sections separated by collars, or shearlocks. The discharge section of the extruder was modified by removal of the die and had no flow restriction other than the tapered final screw section and tapered jacket. The fines were continuously metered to the inlet of the preconditioner of the extruder at a rate of 113 lb./hr. Water and steam were continuously metered into the preconditioner, which was vented to the atmosphere, to result in wetted, hot material discharging from the preconditioner and entering the inlet of the extruder at a moisture content of about 22 percent and a temperature of 130° F. The extruder jacket sections, or heads, were steam heated; the temperature of the penultimate jacketed head was 300° F., and the temperature of the last head, immediately adjacent to the discharge of the extruder, was 245° F. The meter which measures extruder motor amperage registered 17 amps during the run.

The material discharged form the extruder continuously in the form of hot and sticky agglomerates. The moisture content of the material was 21.4 percent and it had an NSI of 27.7.

The particle size of the agglomerated product ranged from 1.8 percent retained on a No. 4 U.S.A. Standard sieve to 15.1 percent passing a No. 25 sieve. This is to be contrasted with the starting material which in its entirety passed a No. 25 sieve.

Example II

A bench-scale aqueous ethanol extraction was used to evaluate the extractability of the agglomerated soybean flake fines. The apparatus consisted of a 3L round bottom, 3 neck flask fitted with an air-driven stirrer, a water-cooled condenser and a thermocouple probe to monitor temperature. The flask was heated by an electric heating mantle controlled by a variable transformer.

One hundred seventy-nine grams of the agglomerated product of Example I (moisture content, 21.4 percent) was placed in the 3-neck flask with a mixture of 975 g. SDA 35A ethanol and 496 g. of water. The mixture was stirred and heated at 130° F. for 45 minutes. The stirrer ran at about 40 rpm. The extract was then decanted and replaced with one liter of an SDA 35A ethanol-water mixture (65% alcohol w/w). After mixing for one minute, the liquid was again decanted. The washing was repeated again. All extracts, washings and solids were filtered on a Buechner funnel fitted with filter paper. The drained extracted solids were then air-dried for about 16 hours and finally dried in a forced-draft oven at 140° F. for one hour. The dried soy protein concentrate contained 4.06 percent moisture and 67.27 percent protein, or 70.1 percent on a moisture-free basis.

Example III

This example is concerned with the use of a modified production-size extruder for defatted soybean flake fines agglomeration.

Dusty flakes were obtained from a commercial source. These flakes were screened as described in Example I. The particle-size distribution of these fines was as follows:

| | |
|---|---|
| Zero percent retained on a No. 20 U.S.A. Standard sieve | |
| 35.1 percent retained on a No. 60 U.S.A. Standard sieve | |
| 11.2 percent retained on a No. 80 U.S.A. Standard sieve | |
| 3.6 percent retained on a No. 100 U.S.A. Standard sieve | |
| 14.4 percent retained on a No. 200 U.S.A. Standard sieve | |
| 35.7 percent through a No. 200 U.S.A. Standard sieve | |
| 100.0 Total | |

The NSI of the composite fines was 75.8.

The fines were processed using a Wenger Model X-200 extruder, equipped with a 200 HP motor. The extruder shaft was comprised of eight screw sections separated by collars, or shearlocks. The discharge section of the extruder was modified by removing the rings containing the die holes and the die adaptor, resulting in no flow restriction at the discharge other than the tapered final screw section and tapered head.

The fines were continuously metered into the preconditioner of the extruder at a rate of 4880 lb./hr. Water and steam were continuously metered to the inlet of the preconditioner of the extruder, which was vented to the atmosphere, to result in wetted, hot material discharging from the preconditioner and entering the inlet of the extruder at a moisture content of about 19.5% and a temperature of 86° F. The extruder heads were water cooled; the temperature of the penultimate head was 164° F., and the temperature of the last head, immediately adjacent to the discharge of the extruder, was 123° F. The temperature of the material discharging from the extruder was approximately 180° F. Water was injected into the material at the extruder inlet such that the moisture content of the material discharging from the extruder was 22.9 percent. The NSI of the material was 29.9. The meter which measures extruder motor amperage registered 190 amps during the run. This can be contrasted with amperage when using an X200 to produce textured defatted soy flour, where a 300 HP. motor would be required to produce 4500 lb./hr., and the extruder motor amperes would be approximately 300 amps. The NSI of such a product will be in range of 5-10.

The particle size distribution of the material was:

| | |
|---|---|
| + U.S.A. Standard #4 | 39.1% |
| + U.S.A. Standard #7 | 21.6% |
| + U.S.A. Standard #10 | 12.7% |
| + U.S.A. Standard #20 | 21.6% |
| + U.S.A. Standard #25 | 1.1% |
| − U.S.A. Standard #25 | 3.9% |

This material was extracted with aqueous ethanol using the procedure described in Example II. The resulting product moisture was 8.77 percent and the protein content was 63.88, affording a dry basis protein content of 70.0 percent for the soy protein concentrate.

Example IV

Dusty, defatted soybean flakes from a commercial source were used in this example. These flakes had the following composition: moisture, 6.79 percent; protein, 52.34 percent; crude fat, 0.57 percent; crude fiber, 4.02 percent; and ash, 5.86 percent. The NSI value of these flakes was 75.4.

The dusty flakes were screened using a Rotex unit fitted with a U.S.A. Standard #26 screen to separate the fines. The feed rate to the Rotex was approximately 130 kg/hr. The weight of fines collected was approximately 49.3% of the weight of the feed material. The particle-size distribution of the fines was:

| | |
|---|---|
| Retained on a U.S.A. Standard #35 sieve | 20.9% |
| Retained on a U.S.A. Standard #60 sieve | 21.4% |
| Retained on a U.S.A. Standard #80 sieve | 10.1 |
| Retained on a U.S.A. Standard #200 sieve | 19.7% |
| Through a U.S.A. Standard #200 sieve | 27.9% |

These fines were processed using a Wenger Model X-20 extruder, modified as discussed in Example I. The fines were continuously metered to the inlet of the preconditioner at a rate of approximately 85 kg/hr. The temperature of the last two jacketed heads was in the range of 110°-126° C. (230° F.-259° F.). The material discharged from the extruder at a moisture content of 21.1%. The particle size distribution of the moist material was as follows:

| | |
|---|---|
| Retained on a U.S.A. Standard #6 sieve | 7.5% |
| Retained on a U.S.A. Standard #8 sieve | 15.8% |
| Retained on a U.S.A. Standard #16 sieve | 41.9% |
| Retained on a U.S.A. Standard #20 sieve | 16.3% |
| Retained on a U.S.A. Standard #35 sieve | 12.8% |
| Through a U.S.A. Standard #35 sieve | 5.7% |

The moist material was then extracted with aqueous ethanol in a pilot plant Crown solvent extractor (Crown Iron Works, Minneapolis, Minn.). The extractor consists of a loop conveyor in which the solvent flows countercurrent to the flow of material to be extracted. The moist material was fed to the extractor at a rate of about 1 kg/minute. The flow rate of aqueous ethanol (67% ethanol w/w) was approximately 3.2 kg/minute. The material was then dried to remove alcohol and moisture.

The dried material was analyzed with the following results:

| | |
|---|---|
| Moisture | 6.06% |
| Protein (N × 6.25) | 64.78% |
| Crude Fat | 0.19% |
| Crude Fiber | 2.96% |
| Ash | 6.10% |

The moisture-free protein content of the material is therefore 69.0%, which compares favorably to the protein content of the product from screened flakes without fines which are extracted in similar fashion.

Example V

The fines separated from dusty defatted soybean flakes were processed using an Anderson expander (Anderson International Corp., Cleveland, Ohio), 4.5 inch diameter, driven by a 50 HP motor. The expander is not jacketed to provide for external heating or cooling. The expander was modified by removing the die plate resulting in no restriction to material flow at the discharge end of the expander. The fines were fed into the expander at a rate of about 600 lb./hr. Water was added to the inlet of the expander at a rate of about 2.8 lb./min. Steam was injected into the material contained within the expander to result in material within the expander having a temperature of 200° F. The expander screw was operated at about 280 rpm, and the motor load was approximately 35 percent of the maximum motor load capacity. The material emerging from the discharge end was in the form of hot, moist agglomerated material. The moisture content of the material was 22.4 percent, and the NSI was 39.6. The particle size of the material was:

| | |
|---|---|
| Retained on a ½ inch sieve | 3.5% |
| Retained on a ¼ inch sieve | 35.2% |
| Retained on a U.S.A. Standard #4 sieve | 16.7% |
| Retained on a U.S.A. Standard #7 sieve | 22.6% |
| Retained on a U.S.A. Standard #20 sieve | 20.3% |
| Through a U.S.A. Standard #20 sieve | 1.7% |

The material was extracted using aqueous ethanol according to the method described in Example II. The resulting dried product contained 8.45 percent moisture and 61.75 percent protein, or 67.5 percent on a moisture-free basis.

For comparison, the expander was equipped with a die plate containing a single die hole, ⅜ inch in diameter. The fines were fed into the inlet of the expander at a rate of about 180 lb./hr. Water was added to the inlet of the expander at a rate of about 2.3 lb./min. Steam was injected into the material contained within the expander at a rate of about 40 lb./hr., resulting in a temperature within the expander of about 220° F. The expander screw was operated at about 280 rpm., and the motor load was approximately 50 percent of maximum motor load capacity. The material emerging from the die hole was variable in flow rate and character, emerging at times in the form of a rope of material, and at other times as discrete particles containing what appeared to be burnt material. At other times no flow was noted, and this resulted in difficulty in feeding the material into the expander. At no time did the expander produce the desired agglomerated material as characterized in the foregoing examples.

Example VI

The fines, separated from dusty, defatted flakes, were processed using a Tecnal Expander, Model 250 (N. Hunt Moore and Associates, Inc., Memphis, Tenn.). The expander was equipped with a die plate containing approximately 35 holes, each ¾" in diameter. The fines were fed into the inlet of the expander at a rate of 80 lb./min. Water was added to the inlet of the expander and steam was injected into the material within the expander at rates which result in material discharging from the expander having a moisture content of about 26 percent and a temperature of about 200° F. The expander ran for only a very short time in this manner. At no time was uninterrupted flow of the material from the die achieved for more than a few seconds. The die holes eventually plugged with material, necessitating shutdown of the equipment.

The die was then taken off, resulting in no restriction to material flow at the discharge of the expander. Operation of the equipment in this mode, with flow rates comparable to those stated above resulted in some variability in the consistency of the material emerging from the expander discharge. However, the product was agglomerated. It appeared that improved mixing of fines, water, and steam within the expander would result in more consistent agglomerates discharging from the expander. This mode of operation is in distinct contrast to that recited above when the expander was fitted with a die plate.

Example VII

Example III was repeated to produce hot, moist agglomerated material. The moist material was then fed to a Fitzmill (Fitzpatrick Company, Elmhurst, Ill.), Model H30, fitted with a sizing screen containing ¼ inch by ¼ inch holes to produce particulates for more ready extractability by aqueous ethanol. Other sizing devices such as the Comitrol (Urschel Laboratories, Inc., Valparaiso, Ind.), may be used.

I claim:

1. In a method for making soy protein concentrate wherein defatted flakes are subjected to ethanol extraction, the step of agglomerating flake fines material in a die-less auger prior to said extraction.

2. The process of claim 1 in which the fines are separated from the flakes prior to said agglomerating step.

3. The process of claim 1 in which fines are associated with said flakes during said agglomerating step.

4. The process of claim 1 in which heat is added to said fines material in inverse proportion to the amount of shear working performed by said auger.

5. The process of claim 1 in which said fines material after agglomeration have a discharge temperature in the range of from about 160° to about 250° F.

6. The process of claim 1 in which said fines material has a moisture content when entering said agglomeration step of from about 18% to about 30% by weight.

7. In a method for making soy protein concentrate wherein defatted flakes are subjected to ethanol extraction, the step of agglomerating flake fines material prior to said extraction in an auger having a terminal restriction less than 50% of the cross sectional area of the terminal end of the auger.

8. A process for preparing soy protein concentrate which comprises agglomerating dusty defatted soybean flake source material in a screw device with substantially no die restriction at the discharge end, including subjecting defatted source material at a moisture content of about 18% to about 30% by weight to shear/heat in the temperature range of 160° to 300° F. to provide agglomerated particulates, and thereafter subjecting the thus agglomerated particulates to extraction by aqueous ethanol having an alcohol content of from 55% to about 75% by weight.

9. The process of claim 8 in which the said defatted source material has a moisture content in the range of about 20% to about 25% by weight when entering said screw device.

10. The process of claim 8 in which said source material contains at least 10% by weight of flake material passing through a No. 25 U.S.A. Standard Sieve.

11. The process of claim 10 in which said source material is subjected to screening to separate soybean flakes from soybean dust.

12. The process of claim 8 in which said source material has an NSI in the range of from about 50 to about 80.

13. A process for preparing soy protein concentrate comprising delivering a constant flow of defatted soybean fines material toward a die-less auger, said material being a member selected from the group consisting of (a) defatted flakes having an NSI of at least 35-40 and having associated therewith at least about 10% by weight flake particles passing a No. 24 U.S.A. Standard Sieve, and (b) flake particles of a size such that substantially all pass a No. 25 U.S.A. Standard Sieve,
  moistening said material to provide a moisture content in the material entering said auger in the range of about 18% to about 30% by weight,
  advancing said material through said auger while inversely relating the heat applied to said auger to the amount of shear working performed by said auger,
  discharging agglomerated material from said auger at a temperature in the range of from about 160° F. to about 250° F., and
  extracting said agglomerated fines material with 55-75% by weight aqueous ethanol at a temperature of from about 125° F. to about 165° F.

14. The process of claim 13 in which said agglomerated material is sized to pass through a No. 4 U.S.A. Standard Sieve.

* * * * *